Nov. 30, 1971  J. A. LEWIS ET AL  3,623,377

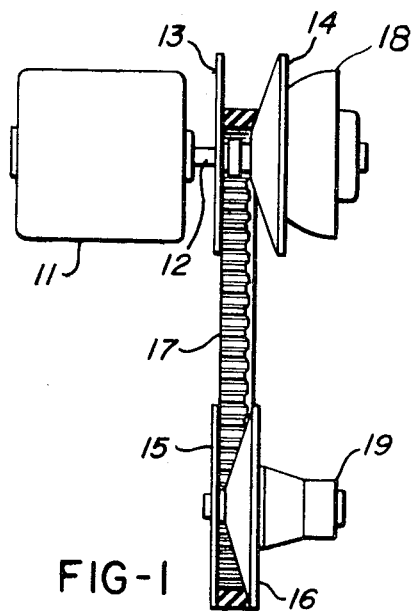
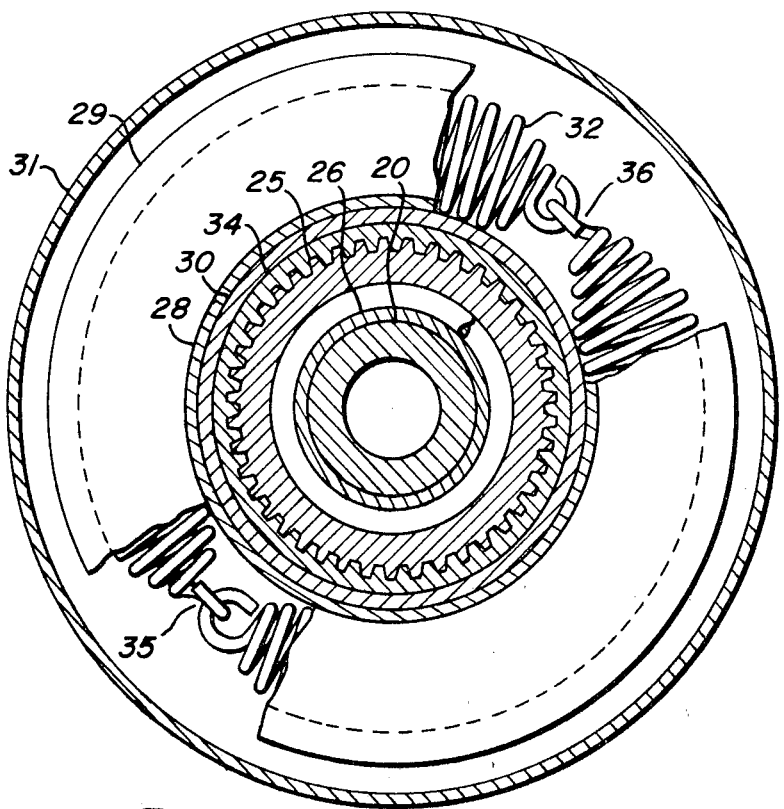

ASYMMETRIC VARIABLE SPEED DRIVE

Filed May 6, 1970  2 Sheets-Sheet 2

INVENTORS
JAMES A. LEWIS
LARRY R. OLIVER

BY

Reuben Wolk
ATTORNEY

United States Patent Office 3,623,377
Patented Nov. 30, 1971

3,623,377
ASYMMETRIC VARIABLE SPEED DRIVE
James A. Lewis and Larry R. Oliver, Springfield, Mo.,
assignors to Dayco Corporation, Dayton, Ohio
Filed May 6, 1970, Ser. No. 35,022
Int. Cl. F16h 55/52
U.S. Cl. 74—230.17
8 Claims

ABSTRACT OF THE DISCLOSURE

A variable speed drive consisting of driving and driven mechanisms having sheaves, and a V-belt for transmitting power between them. The V-belt has an asymmetric trapezoidal cross section, one side face having an angle of zero to six degrees and the other having an angle of 12 to 26 degrees. The angles of the sheave flanges correspond closely to the angles of the belt side faces. A cam housing is secured to the movable flange on the driving side and has a garter spring mounted concentric to the drive shaft which acts against the housing to create axial motion of the movable flange with respect to the fixed one. The optimum design is expressed by a formula relating to the various components of the drive.

BACKGROUND OF THE INVENTION

This invention relates to a variable speed drive which consists of a driving mechanism and a driven mechanism, both having sheaves, in which the power is transmitted from the driving to the driven side through a V-belt. Changes in speed and torque are accomplished by having one fixed flange and one axially movable flange in each of the sheaves. Mechanisms of this type are generally in use for vehicles such as snowmobiles, all-terrain vehicles, powered cycles, and the like, in which it is necessary to make rapid changes in speed and power with a simple mechanism. The mechanism is effectively an automatic shifting device, except that this is accomplished without the use of gears as in an automobile; instead the shifting is accomplished by lateral movement of one flange of the driving sheave which in turn creates axial movement of one flange of the driven sheave. Since the driving sheave is attached by a shaft to the engine or motor which is the prime mover, increased r.p.m. of the prime mover will move the movable flange of the driving sheave toward the fixed flange, thereby causing the belt to move radially outward of the sheave and thus achieve a larger pitch diameter. This change in position is transmitted through the belt to the driven sheave, which causes the movable flange to move away from the fixed flange, while at the same time the belt moves radially inward of the driven sheave. The result is a smaller pitch diameter of the driven sheave. The ratio between the pitch diameters of the sheaves creates a corresponding change in the speed of the driven side of the mechanism. When the engine is slowed down a decrease in r.p.m. causes the reverse action to take place.

In order to increase the range of speed variation it has been necessary to resort to a number of expedients in the past, primarily by the use of wider belts or multiple sheaves. However, these approaches have been unsatisfactory since any attempt to use additional sheaves creates problems of weight, cost, and space; such problems must be overcome in the type of vehicles mentioned above, if improved operation is to be obtained. It was found by Moogk in this Patent No. 3,365,967 that improved results were obtained by the use of an asymmetric V-belt because this permitted the use of a belt having a narrower outer width. Moogk discloses the use of a narrow angle on one side face of the belt; namely, zero to one degree. This has the effect of reducing the outer belt width by half, so that the belt is capable of running at higher speeds and has a longer life than a symmetrical belt.

SUMMARY OF THE INVENTION

There are certain limitations in the asymmetric drive of the prior art. First, there has been no thought of using this drive on a movable vehicle, so that the design was made without considering factors of space and weight. Second, the face angle was limited to a range of zero to one degree to create the desired result. Applicants have found that a superior drive can be created by the use of a different type of mechanism that is associated with the movable flange in the driving mechanism and have done considerable basic work in developing this concept. This is expressed in the form of an equation which relates the speed to other factors in the design of the mechanism, thus enabling the designer to quickly determine the other factors necessary to meet the desired specifications. At the same time, it has been found that it is unnecessary to be limited to the zero to one degree range at the narrower belt angle, but that excellent results are achieved within the zero to six degree range and more specifically in the one to six degree range. The specific structure involves the use of a cam housing which is secured to the movable flange of the driving sheave, with a garter spring mounted within this cam. As the speed of the prime mover increases, the centrifugal force causes the garter spring to expand outward and create pressure against the cam housing that is translated into axial movement of the movable flange toward the fixed flange on the driving side. As will be set forth below, this is expressed by a specific formula.

BRIEF DESCRIPTION OF THE DRAWINGS

FIG. 1 is an elevational view of the driving and driven mechanisms, in a no-load (idle) position.

FIG. 4 is a section taken along line 4—4 of FIG. 2, further illustrating the mechanism.

DESCRIPTION OF THE PREFERRED EMBODIMENT

Figure 2:
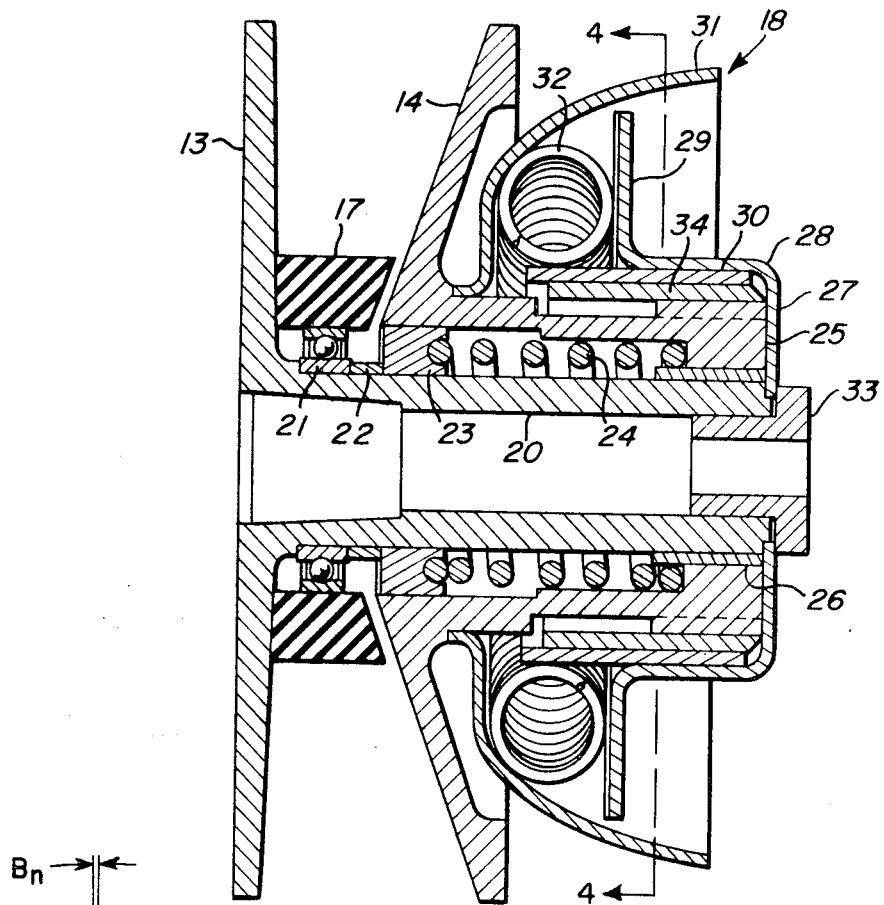
FIG. 2 is a sectional view of the driving mechanism in idle position.

Referring to the drawings, FIG. 1 illustrates the overall relationship of the mechanism consisting of the prime mover 11 which may be a motor or an engine. A driving shaft 12 extends from the prime mover to a driving mechanism 18 which includes a driving sheave with a fixed flange 13 and movable flange 14. Power is transmitted from this sheave to the driven sheave which is part of the driven mechanism 19; the driven sheave comprises fixed flange 15 and movable flange 16. Transmission of power takes place through V-belt 17, which has an asymmetric trapezoidal cross section.

Figure 3:
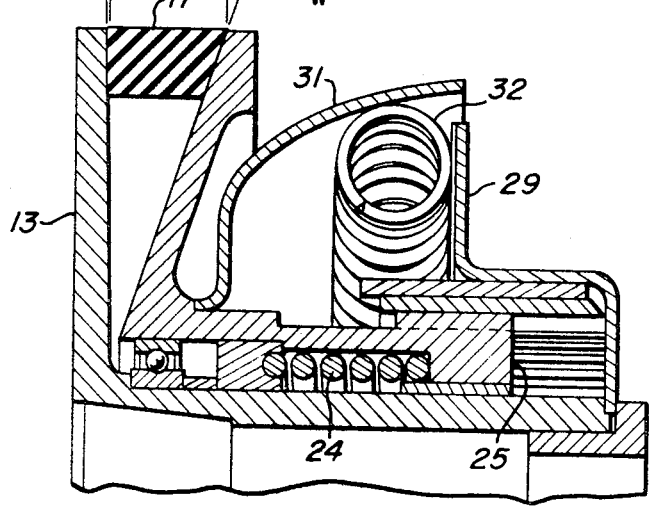
FIG. 3 is a partial sectional view similar to FIG. 2 illustrating the mechanism in a high speed position.

As best shown in FIG. 3, the asymmetric belt 17 has two side faces, one having a wider angle designated as angle $B_n$, which is between zero and six degrees, but axis of the belt; while the other side face has a narrower angle $B_n$, which is between zero and six degrees, but preferably between one and six degrees.

Referring to FIGS. 2 and 3, the driving mechanism includes a shaft 20 which is coupled to the driving shaft 12 from the prime mover. This coupling may be accomplished by a number of different conventional devices; for example, a bolt (not shown) may be placed through an end locking bolt 33 and passed inside shaft 20 into the end of the shaft 12. A bearing 21 is mounted on the shaft 20 and is secured against axial movement by spacer ring 22 and bushing 23. An idle return compression spring 24 is also mounted concentrically of the shaft 20 and retained at one end by the bushing 23. The spring 24 is further retained by means of a sleeve 25. The sleeve 25 is an integral part of the movable flange 14, both of which are axially slidable upon the shaft 20. The movable flange 14 slides on retaining bushing 23, and sleeve 25 is fixed to bushing 26 which in turn slides upon the shaft 20. Mounted around the end of the shaft 20 and the sleeve 26 is a cup 27 having a horizontal section 28 and outwardly extending vertical section 29. A sleeve 30 which is also concentric with the shaft is mounted inward of the horizontal section 28.

Also mounted on the flange 14 is a cam housing 31 in which is placed a garter spring 32. The garter spring, as more fully shown in FIG. 4, consists of two tension springs which are secured together at 35 and 36 to create in effect a toroidal tension spring. While this is illustrated as being formed of two separate springs, it is also contemplated that this may be a single tension spring joined together in one place only to form the same configuration. The spring is held in place within the cam housing by means of the vertical section 29 of the cup, and the sleeve 30, so that any force of the spring as it "grows" outwardly is transmitted through the cam housing 31 and the flange 14 into axial motion.

Torque is transmitted from the prime mover 11 to thet movable flange 14 through the locking bolt 33 which also holds the entire assembly into place on shaft 20. The locking bolt 33 transmits the torque to cup 27 which is fixed to sleeve 30, which in turn is fixed to the female spline 34. As best shown in FIG. 4, the female spline slides over the transmits the torque to the male spline formed on sleeve 25 which is an integral part of movable flange 14.

The design work which has been done to establish the relationship of the various portions of this mechanism has been translated into a formula which the designer can then use to develop such variables as the shape of the housing, the design of the garter and idle return springs, and the specific belt angles. This formula is expressed as follows:

$$\text{R.p.m.} = \sqrt{\frac{1.69 \times 10^6}{W D_c^2} \left[ \frac{1}{2\pi} \left( F_r + F_o + K_r \frac{(D_r - D_o)}{2} (\tan B_w + \tan B_n) \right) \left( U + \frac{\cos A + U \sin A}{\sin A - U \cos A} \right) + K_c \pi (D_c - D_g) \right]}$$

The above formula expresses the r.p.m. necessary to maintain belt diameter equilibrium for any given output torque, in which:

$D_r$ is the pitch diameter of the belt
$D_o$ is the minimum pitch diameter of the belt
$F_r$ is the axial force on the belt
$F_o$ is the idle return spring preload compression
$K_r$ is the idle return spring rate
$D_c$ is the diameter of the garter spring
$D_g$ is the diameter of the garter spring when the sheave is not in rotation.
W is the weight per unit length of the garter spring
$K_c$ is the rate of the garter spring
U is the coefficient of friction of the garter spring on the cam housing
A is the angle between the axial direction and tangent at the contact point of the garter spring and the cam housing
$B_w$ is the angle of the wider angle sheave flange
$B_n$ is the angle of the narrower angle sheave flange

OPERATION OF THE MECHANISM

The position of the driving mechanism at rest or idle is illustrated in FIG. 2 in which the belt 17 is at the innermost position between the driving flanges, the movable flange 14 being separated from the fixed flange 13 to the maximum extent. As the speed of the prime mover is increased by the operator, rotation of the mechanism 18 causes the garter spring to expand outwardly. Since the spring is locked in place by the vertical section 29 of the cup 27, and the sleeve 30, this outward force is transmitted through the cam housing 31 in a manner according to the specific design of this housing. The force is transmitted against the flange 14 to which the housing is secured, thereby causing the movable flange 14 to close with respect to the fixed flange 13 until it engages the belt. The initial engagement provides a low speed position, then continued motion eventually causes the flange to reach the maximum closed position shown in FIG. 3. This, of course, tends to overcome the effect of the idle return spring 24 which is shown as fully extended in FIG. 2 but compressed in FIG. 3. As the sheave reaches this closed position the belt rides outwardly toward the top of the sheave to the position shown in FIG. 3, and thus the driving sheave achieves a maximum pitch diameter. The outer movement of the belt in turn creates pressure against the movable flange 16 of the driven mechanism 19, causing it in turn to move away from the fixed flange 15 (from the FIG. 1 position), until the belt reaches its innermost position on the sheave. The driven sheave thus achieves a minimum pitch diameter.

Conversely, when the speed of the prime mover is reduced, the outward force of the garter spring is relaxed, permitting the movable flange 14 to slide away from the fixed flange 13. This permits the belt to move inward toward the FIGS. 1 and 2 position, as the outward force of the idle return spring 24 again predominates. This in turn permits the belt to move outwardly into the driven sheave toward the FIG. 1 position.

Some idea of the range of speeds possible in this invention may be obtained by utilizing some specific figures, although it is to be understood that these figures are only exemplary and are not meant to be limiting in any way. In the low speed position the driving sheave has a pitch diameter of 3.188 inches, while the driven sheave has a pitch diameter of 10.375 inches. This, therefore, gives us a speed ratio of 1.00 to 3.25. At high speed (in the FIG. 3) position the driving sheave has a pitch diameter of 7.75 inches, while the driven sheave has a pitch diameter of 6.45 inches which then provides a ratio of 1.20 to 1.00. This could be considered an overdrive position.

The advantage of the asymmetric design lies in the fact that for the given outer width of the belt, a more rapid change in ratio is attainable. The particular design of the spring 32 fits into this desired rapid speed change because it provides a simple, smooth operation, is easy and inexpensive to replace, and provides an instant response to the sudden load changes within the system. The mechanism thus eliminates considerable moving parts that are subject to wear, such as found in the prior art. An additional advantage of the spring is that the pattern of shifting can be very readily changed within the same mechanism by simply using a spring having different characteristics; this may be accomplished by changing the diameter of the spring, the number of coils, the diameter of the wire used to make the spring, or the metallurgical formulation of the wire. Since all these factors affect the spring's performance, this provides a designer with a ready tool for change in design.

The designer can also utilize the formula expressed above to change the design of the cam housing or the idle spring in order to achieve the exact speed and characteristics which are desired.

While a specific configuration is shown and described herein, it is understood that other modifications may be made within the scope of the invention.

We claim:
1. In a variable speed drive having a shaft with a sheave mounted thereon and a power transmission belt passing over said sheave; the combination in which said belt has an asymmetric trapezoidal cross section, one side face of said belt having an angle of zero to six degrees with the vertical axis of said belt, the other side face having an angle of 12 to 26 degrees with said vertical axis; said sheave comprising a fixed flange mounted on said shaft and having an angle approximately equal to the angle of one side face of said belt, and a second flange concentric with said shaft and axially movable thereto, said movable flange having an angle approximately equal to the angle of the other side face of said belt, said movable flange having a cam housing secured thereto, and means located in said housing urging said movable flange toward said fixed flange during increase in speed, said means being a garter spring.

2. The combination of claim 1 in which said garter spring acts against said housing to urge said housing and said movable flange toward said fixed flange during increase in speed.

3. The combination of claim 1 including an idle return spring mounted concentrically of said shaft, said spring tending to move said movable flange away from said fixed flange.

4. The combination of claim 3 in which the r.p.m. required to maintain belt diameter equilibrium for a given output torque is expressed by the formula:

$$R.p.m. = \sqrt{\frac{1.69 \times 10^6}{WD_c^2} \left[ \frac{1}{2\pi} \left( F_r + F_o + K_r \frac{(D_r - D_o)}{2} (\tan B_w + \tan B_n) \right) \left( U + \frac{\cos A - U \sin A}{\sin A - U \cos A} \right) + K_c \pi (D_c - D_g) \right]}$$

where $D_r$ is the pitch diameter of the belt; $D_o$ is the minimum pitch diameter of the belt; $F_r$ is the axial force on the belt; $F_o$ is the idle return spring preload compression; $K_r$ is the idle return spring rate; $D_c$ is the diameter of the garter spring; $D_g$ is the diameter of the garter spring when the sheave is not rotating; W is the weight per unit length of the garter spring; $K_c$ is the rate of the garter spring; U is the coefficient of friction of the garter spring on the cam housing; A is the angle between the axial direction and tangent at the contact point of the garter spring and the cam housing; $B_w$ is the angle of the wider sheave flange, and $B_n$ is the angle of the narrower sheave flange.

5. A speed responsive drive unit adapted to be mounted on a shaft extending from a variable speed power source, said unit comprising a shaft member adapted to be secured to the shaft from the power source, a generally radially extending first flange secured to said shaft member, a second flange, means mounted on said shaft member and supporting said second flange for axial movement on said shaft member relative to said first flange, one of said flanges having a tapered annular inner face forming a slight angle with a plane normal to the axis of said shaft member, the other of said flanges having a tapered annular inner face forming with said plane an angle substantially greater than said angle formed by said face of said one flange, a flexible drive belt extending between said flanges and having opposite a symmetrical tapered sides conforming substantially to the taper angles of the corresponding said faces, an elastically expandable actuating member disposed around said shaft member, said actuating member being centrifugally expandable in response to an increase in the speed of said shaft member above a predetermined limit, said second flange including means forming an annular tapered cam surface surrounding said actuating member, and said actuating member being effective to expand outwardly against said cam surface in response to an increase in speed of said shaft member for urging said second flange toward said first flange to increase the effective pitch diameter of said belt on said flanges.

6. A speed responsive drive unit as defined in claim 5 wherein said face of said flange and the corresponding side of said belt each form an angle of not more than six degrees with said plane.

7. A speed responsive drive unit as defined in claim 5 wherein said cam surface is curved to provide a decreasing axial force on said second flange as said actuating member moves outwardly in response to an increase in speed of said shaft member.

8. A speed responsive drive unit adapted to be mounted on a shaft extending from a variable speed power source, said unit comprising a shaft member adapted to be secured to the shaft from the power source, a generally radially extending first flange secured to said shaft member, a second flange, means mounted on said shaft member and supporting said second flange for axial movement on said shaft member relative to said first flange, one of said flanges having a tapered inner face forming a slight angle with a plane normal to the axis of said shaft member, the other of said flanges having a tapered annular inner face forming with said plane an angle substantially greater than said angle formed by said face of said one flange, an idle bearing rotatably mounted on said shaft member between said first and second flange, a flexible drive belt extending between said flanges and having opposite asymmetrical tapered sides conforming substantially to the taper angles of the corresponding said faces, said idle bearing being effective to engage said belt when said flanges are spaced apart by a predetermined distance, an elastically expandable actuating member disposed around said shaft member, said actuating member including at least one circumferentially extending garter spring and being centrifugally expandable in repsonse to an increase in the speed of said shaft member above a predetermined limit, said second flange including means forming an annular tapered cam surface surrounding said actuating member, and said actuating member being effective to move outwardly against said cam surface in response to an increase in speed of said shaft member for urging said second flange toward said first flange to increase the effective pitch diameter of said belt on said flanges.

References Cited
UNITED STATES PATENTS

| | | | |
|---|---|---|---|
| 3,365,967 | 1/1968 | Moogk | 74—230.17 A |
| 2,916,926 | 12/1959 | Albertson et al. | 74—230.17 C |
| 2,623,400 | 12/1952 | Davis | 74—230.17 CC |
| 2,709,372 | 5/1955 | Melone | 74—230.17 CC |

CORNELIUS J. HUSAR, Primary Examiner

PO-1050
(5/69)

UNITED STATES PATENT OFFICE
CERTIFICATE OF CORRECTION

Patent No. __3,623,377__  Dated __November 30, 1971__

Inventor(s) __James A. Lewis and Larry R. Oliver__

It is certified that error appears in the above-identified patent and that said Letters Patent are hereby corrected as shown below:

Column 2, line 56 from the top (line 14 from the bottom), should read --- $B_w$, which is between 12 and 26 degrees with the vertical ---

Column 3, line 25, "thet" should read --- the ---

Claim 6, line 2, --- first --- should be inserted before "flange"

Claim 8, line 9, --- annular --- should be inserted after "tapered"

Signed and sealed this 3rd day of October 1972.

(SEAL)
Attest:

EDWARD M. FLETCHER, JR.
Attesting Officer

ROBERT GOTTSCHALK
Commissioner of Patents